US011281491B2

(12) United States Patent
Bruun et al.

(10) Patent No.: US 11,281,491 B2
(45) Date of Patent: Mar. 22, 2022

(54) EXECUTION OF SERVICES CONCURRENTLY (71) Applicant: HEWLETT PACKARD ENTERPRISE DEVELOPMENT LP, Houston, TX (US)

(72) Inventors: Peter Michael Bruun, Alleroed (DK); Jane Koenigsfeldt, Alleroed (DK); Mads Stenhuus, Alleroed (DK)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/198,609

(22) Filed: Nov. 21, 2018

(65) Prior Publication Data
US 2020/0159569 A1 May 21, 2020

(51) Int. Cl.
G06F 9/48 (2006.01)
G06F 16/901 (2019.01)

(52) U.S. Cl.
CPC ........ *G06F 9/4843* (2013.01); *G06F 16/9024* (2019.01)

(58) Field of Classification Search
CPC .... G06F 9/4843; G06F 9/4881; G06F 9/5038; G06F 16/9024
USPC ........................................................ 718/106
See application file for complete search history.

(56) References Cited

U.S. PATENT DOCUMENTS

| 7,111,299 | B2 | 9/2006 | Tran et al. |
| 7,814,142 | B2 | 10/2010 | Mamou et al. |
| 7,950,007 | B2 | 5/2011 | Mohindra et al. |
| 8,191,043 | B2 | 5/2012 | Mohindra et al. |
| 8,245,122 | B2 | 8/2012 | Liu et al. |
| 8,301,755 | B2 | 10/2012 | De Peuter et al. |
| 8,418,002 | B2 | 4/2013 | Lazzaro |
| 8,863,137 | B2 | 10/2014 | Keller et al. |
| 8,880,591 | B2 | 11/2014 | Feldman et al. |
| 8,914,499 | B2 | 12/2014 | Houlihan et al. |
| 8,954,418 | B2 | 2/2015 | Faerber et al. |

(Continued)

FOREIGN PATENT DOCUMENTS

| CN | 1942860 A | 4/2007 |
| CN | 101933000 A | 12/2010 |

(Continued)

OTHER PUBLICATIONS

Cerrato, et al., "User-Specific Network Service Functions in an SDN-Enabled Network Node", Deptment of Computer and Control Engineering. Politecnico di Torino, Torino, Italy, 2014, 2 pages.

(Continued)

Primary Examiner — John Q Chavis
(74) Attorney, Agent, or Firm — Nolte Lackenbach Siegel (57) ABSTRACT Methods to execute an orchestration of computing services concurrently, the method including developing a representation of a set of services where each service relates to other services via different types of relationships. Also, applying a set of dependency rules for each type of relationship within the set of services such that the application of the dependency rules creates inter-step dependencies between steps representing state transitions of the set of services and developing the orchestration plan based on the inter-step dependencies that allows for concurrent execution of nondependent steps.

20 Claims, 8 Drawing Sheets

(56) References Cited

U.S. PATENT DOCUMENTS

| | | | |
|---|---|---|---|
| 9,286,106 B1 | 3/2016 | Huang | |
| 9,367,374 B2 | 6/2016 | Kaus et al. | |
| 9,378,120 B2 | 6/2016 | Chakraborty et al. | |
| 9,430,262 B1 | 8/2016 | Felstaine et al. | |
| 9,594,601 B2 | 3/2017 | Shau et al. | |
| 9,998,562 B1 | 6/2018 | Peterson et al. | |
| 10,178,027 B2 | 1/2019 | Johnsen et al. | |
| 10,275,258 B2* | 4/2019 | Zellermayer | G06F 9/4401 |
| 10,326,845 B1 | 6/2019 | Jaeger | |
| 10,348,857 B2 | 7/2019 | De et al. | |
| 10,419,524 B2 | 9/2019 | Schincariol et al. | |
| 10,454,771 B2 | 10/2019 | Ellis et al. | |
| 10,594,621 B2 | 3/2020 | Sharma et al. | |
| 10,785,128 B1 | 9/2020 | Bawcom | |
| 11,080,491 B2 | 8/2021 | Mihindukulasooriya et al. | |
| 2004/0260602 A1 | 12/2004 | Nakaminami et al. | |
| 2005/0086562 A1* | 4/2005 | Demsky | G06F 11/0751 |
| | | | 714/100 |
| 2005/0155042 A1 | 7/2005 | Kolb et al. | |
| 2005/0240354 A1 | 10/2005 | Mamou et al. | |
| 2006/0029054 A1 | 2/2006 | Breh et al. | |
| 2006/0256733 A1 | 11/2006 | Bejerano | |
| 2006/0268742 A1 | 11/2006 | Chu et al. | |
| 2007/0043803 A1 | 2/2007 | Whitehouse et al. | |
| 2007/0294668 A1 | 12/2007 | Mohindra et al. | |
| 2008/0294777 A1 | 11/2008 | Karve et al. | |
| 2009/0157723 A1 | 6/2009 | De Peuter et al. | |
| 2009/0193439 A1 | 7/2009 | Bernebeu-Auban et al. | |
| 2009/0327216 A1 | 12/2009 | Brown et al. | |
| 2010/0057780 A1 | 3/2010 | Isobe et al. | |
| 2010/0333109 A1 | 12/2010 | Milnor | |
| 2011/0046992 A1* | 2/2011 | Erhard | G06Q 10/0637 |
| | | | 705/7.11 |
| 2011/0145657 A1 | 6/2011 | Bishop et al. | |
| 2011/0276444 A1 | 11/2011 | Toernkvist | |
| 2012/0016713 A1 | 1/2012 | Wilcock et al. | |
| 2012/0089726 A1 | 4/2012 | Doddavula | |
| 2012/0117226 A1 | 5/2012 | Tanaka et al. | |
| 2013/0036425 A1* | 2/2013 | Zimmermann | G06F 9/4881 |
| | | | 718/106 |
| 2013/0127891 A1 | 5/2013 | Kim et al. | |
| 2013/0151317 A1 | 6/2013 | Charfi et al. | |
| 2013/0198760 A1 | 8/2013 | Cuadra et al. | |
| 2013/0217361 A1 | 8/2013 | Mohammed et al. | |
| 2013/0290937 A1* | 10/2013 | Joukov | G06F 11/3692 |
| | | | 717/129 |
| 2014/0013315 A1 | 1/2014 | Genevski et al. | |
| 2014/0074905 A1 | 3/2014 | Schincariol et al. | |
| 2014/0075048 A1 | 3/2014 | Yuksel et al. | |
| 2014/0098673 A1 | 4/2014 | Lee et al. | |
| 2014/0172944 A1 | 6/2014 | Newton et al. | |
| 2014/0229945 A1 | 8/2014 | Barkai et al. | |
| 2014/0236843 A1 | 8/2014 | Bain et al. | |
| 2014/0250489 A1 | 9/2014 | Calo et al. | |
| 2014/0278662 A1* | 9/2014 | Reed | G06Q 10/0631 |
| | | | 705/7.17 |
| 2015/0006733 A1 | 1/2015 | Khan et al. | |
| 2015/0120380 A1 | 4/2015 | Deshpande et al. | |
| 2015/0124645 A1 | 5/2015 | Yadav et al. | |
| 2015/0278395 A1 | 10/2015 | Ben et al. | |
| 2015/0309780 A1 | 10/2015 | Ruehl et al. | |
| 2015/0365322 A1 | 12/2015 | Shatzkamer et al. | |
| 2015/0378774 A1* | 12/2015 | Vermeulen | G06F 9/466 |
| | | | 707/703 |
| 2016/0080422 A1 | 3/2016 | Belgodere et al. | |
| 2016/0094477 A1 | 3/2016 | Bai et al. | |
| 2016/0323082 A1 | 11/2016 | Watanabe | |
| 2016/0378450 A1* | 12/2016 | Fu | G06F 8/60 |
| | | | 717/177 |
| 2017/0161104 A1 | 6/2017 | Johnson et al. | |
| 2017/0161129 A1 | 6/2017 | Johnson et al. | |
| 2017/0207968 A1 | 7/2017 | Eicken et al. | |
| 2017/0257432 A1* | 9/2017 | Fu | H04L 67/2823 |
| 2017/0270214 A1* | 9/2017 | Narasimhan | G06F 16/9535 |
| 2017/0289060 A1 | 10/2017 | Aftab et al. | |
| 2017/0322954 A1 | 11/2017 | Horowitz et al. | |
| 2017/0366623 A1 | 12/2017 | Shi et al. | |
| 2018/0083828 A1 | 3/2018 | Cartaya et al. | |
| 2018/0107186 A1* | 4/2018 | Brown | G05B 19/0426 |
| 2018/0145884 A1 | 5/2018 | Stefanov et al. | |
| 2018/0157472 A1 | 6/2018 | Chen | |
| 2018/0165071 A1 | 6/2018 | Raghavan et al. | |
| 2018/0234308 A1 | 8/2018 | Bruun et al. | |
| 2018/0246755 A1* | 8/2018 | Ailamaki | G06F 9/4843 |
| 2018/0359162 A1 | 12/2018 | Savov et al. | |
| 2019/0058638 A1 | 2/2019 | Ahuja et al. | |
| 2019/0068440 A1 | 2/2019 | Nelson | |
| 2019/0155926 A1 | 5/2019 | Scheideler et al. | |
| 2020/0186446 A1 | 6/2020 | Yousaf | |

FOREIGN PATENT DOCUMENTS

| | | |
|---|---|---|
| CN | 102138315 A | 7/2011 |
| CN | 103516781 A | 1/2014 |
| CN | 104901998 A | 9/2015 |
| CN | 105164660 A | 12/2015 |
| WO | WO-2007146368 A2 | 12/2007 |
| WO | WO-2008091663 A1 | 7/2008 |
| WO | 2011/162744 A1 | 12/2011 |
| WO | 2015/032435 A1 | 3/2015 |
| WO | 2017/129248 A1 | 8/2017 |

OTHER PUBLICATIONS

Clayman, et al., "The Dynamic Placement of Virtual Network Functions", Telecom Italia Strategy Future Centre. Via Reiss Romoli 274, 10148 Turin, Italy. IEEE 2014, 9 pages.

Fdhila Walid et al., "On Evolving Partitioned Web Service Orchestrations," IEEE International Conference on Service-Oriented Computing and Applications, Dec. 2012 pp. 1-7.

Ferry, D., et al.; "A Real-time Scheduling Service for Parallel Tasks"; Jan. 23, 2013; 11 pages.

Intel, "End-To-End NFV vEPC Service Orchestration of a Virtual EPC Network Function Virtualization Use Case on Intel Architecture", Intel Network Builders Reference Architecture, Retreived on Mar. 26, 2017, 24 pages.

International Search Report and Written Opinion, International Application No. PCT/EP2016/051851, dated Oct. 10, 2016, pp. 1-10, EPO.

International Searching Authority, "Notifcation of Transmittal of the International Seach Report and the Written Opinion", PCT/EP2014/070838, dated Jun. 15, 2015, 12 pages.

Oracle, "4 Understanding Orchestration," Oracle® Communications Order and Service Management Concepts, 2009, pp. 1-55, Release 7.2.2, Retrieved from the Internet on Nov. 24, 2017 at URL: <docs.oracle.com/cd/E35413_01/doc.722/e35415/cpt_orchestration.htm#autoId0>.

Xiao et al., "Process Dependencies and Process Interference Rules for Analyzing the Impact of Failure in a Service Composition Environment", Proceedings of the 10th international conference on Business information systems, 2007, pp. 67-81.

Laurent et al., "Planning for Declarative Processes", The 29th Annual ACM Symposium on Applied Computing, 2014, pp. 1126-1133.

Kelly et al., "Output-Valid Rollback-Recovery", HP Labs, HPL-2010-155, 2010, pp. 1-14.

Bohm et al., "Processes Are Data: a Programming Model for Distributed Applications", Web Information Systems Engineering—WISE 2009, 12 Pages.

Yang et al., "Research on Software Architecture-based Composition of Internetware", May 15, 2007, 3 pages.

Casati et al., "eFlow: A Platform for Developing and Managing Composite E-Services", Proceedings Academia/Industry Working Conference on Research Challenges, 2000, pp. 341-348.

* cited by examiner

EXECUTION OF SERVICES CONCURRENTLY

BACKGROUND

Orchestration defines policies and service levels through automated workflows, provisioning, and change management. Uses of orchestration may be discussed in the context of service-oriented architecture, virtualization, provisioning, converged infrastructure, telecommunications, and datacenter topics. As such, orchestration provides centralized management of computing resources that allows for management, including the ability to create, configure, remove, or otherwise modify applications for a defined purpose.

BRIEF DESCRIPTION OF THE DRAWINGS

Examples described herein may be understood by reference to the following description taken in conjunction with the accompanying drawings, in which like reference numerals identify like elements.

While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives falling within the spirit and scope of the examples described herein and the appended claims.

DETAILED DESCRIPTION

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

Orchestration provides a process of actions directed toward achieving goals and objectives defined in a service orchestration request. Service orchestration may include composing architecture, tools, and processes, stitching software and hardware components together, and connecting and automating workflows when applicable to deliver a defined service. As the requirement for new resources increases with an introduction of new applications, automated tools by way of orchestration can perform tasks previously handled by multiple administrators operating on individual pieces of a physical stack. Serializing state models indicates a sequence of events based on modification of one or more nodes of the model. Serializing dependency graph models may be utilized for simplistic decomposition model and state-less models; however, for more complex graph models, other solutions may be implemented for solving greater numbers of possible model transformations.

"Services" as explained herein, refers to the orchestration of changes in a complex system including interactive services, networks, and systems for the creation of communication services.

One solution uses ad hoc decomposition methods and queue-based execution plans. For example, machine code executable by a processor may push action queues in an order intended to generate the correct sequence of actions. This solution results in unpredictable instances and may be unable to handle complex re-creations of specific use cases. For example, using decomposition methods and queue-based executions are limiting when going through state-transitions that effectively tear down and re-create parts of a configuration topology. Additionally, ad-hoc approaches may be unable to detect conflicting requirements which may lead execution engines to make unpredictable arbitration decisions. Unpredictable arbitration decisions result in an unstable end-to-end orchestration solution as the solution becomes untestable.

A second solution uses models declared as graph templates, referred to as the Topology and Orchestration Specification for Cloud Applications ("TOSCA") Organization for the Advancement of Structured Information Standards ("OASIS") standard language. In the TOSCA OASIS solution, standard language is used to describe a topology of cloud-based web services, their components, relationships, and the processes that manage the web services. The resulting models in this solution are static and may not be modified. Modifications to the resulting models institute a tear-down and recreation of the full model and components, and doing so may result in downtime.

A third solution uses services defined by hierarchical decomposition which is a type of simplified model. In the hierarchical decomposition, a hierarchical decision process is used to evaluate a sequence of actions; however, this solution may not capture graph structured services, as modifications to the hierarchy structure would elicit a redesign of the full structure. In this example, the hierarchical decomposition solution is more of a static approach, not providing modifications as changes to services occur, and as such, may be unable to handle changes that span the hierarchy without a full redesign. In another example of the hierarchical decomposition, a tree model may be used to represent a relationship between services. In such a model, each node in the structure may include a parent node and/or child node. From a modeling perspective, tree structures are simpler than other decomposition and state-models. Such models fail to account for the more difficult and complex models that include various interdependencies between the nodes of the tree. In certain situations, the nodes may share no commonality.

Another solution uses a simplistic state-model in which the various states of a service are interdependent on one another. In this solution, a node in a graph is represented in the state as fully configured or non-existent. This approach reduces the problem of modeling the dependencies between states of related nodes in the graph; however, is unable to handle the complexity of external system configurations.

Solutions directed to planning execution steps based on complex dependent models do not consider the relationship between process steps. The steps are performed linearly, And the linear execution of the steps slows down processing because steps that are not dependent on a step being executed remain idle. The present disclosure includes a planner that determines whether steps are dependent on one another. Nondependent steps may thereby be processed concurrently. The planner works on complex step graphs with state-based relationships between the graph nodes.

More specifically, the present disclosure uses computing systems to create a representation of a set of services. Based on the relationships, a set of dependency rules is applied for each type of relationship in the representation. In response to the application of the set of dependency rules, inter-step dependencies are created between steps representing state transitions for the set of services. From the inter-step dependencies, an orchestration plan may be developed. The orchestration plan is derived from a generated step graph that defines the relationships between the represented steps. The step graph may be, for example, a directed graph or other type of representation of the relationships between various steps. The step graph may thereby allow for the planning and execution of nondependent steps concurrently, allowing the system to continually process steps while experiencing less time waiting on nondependent steps.

Implementations of the present disclosure may further provide modelers, planners, schedulers, and executors that allow steps to be executed concurrently. In certain implementations, the modeler may develop a representation of each step as it is related to other steps. The planner may then apply a set of dependency rules for each type of relationship between each step. The development of the inter-step dependencies may thereby allow for development of an orchestration plan that allows for concurrent execution of nondependent steps. A scheduler may track the dependencies between each step, thereby allowing steps that do not depend on a prior step to execute. Accordingly, the scheduler may update the step plan as steps complete, allowing all nondependent steps to execute. The concurrent execution of such steps may thereby allow for fasting processing times. Such a system may also have an executor that is connected to the planner that executes the nondependent steps as indicated by the scheduler.

Figure 1:
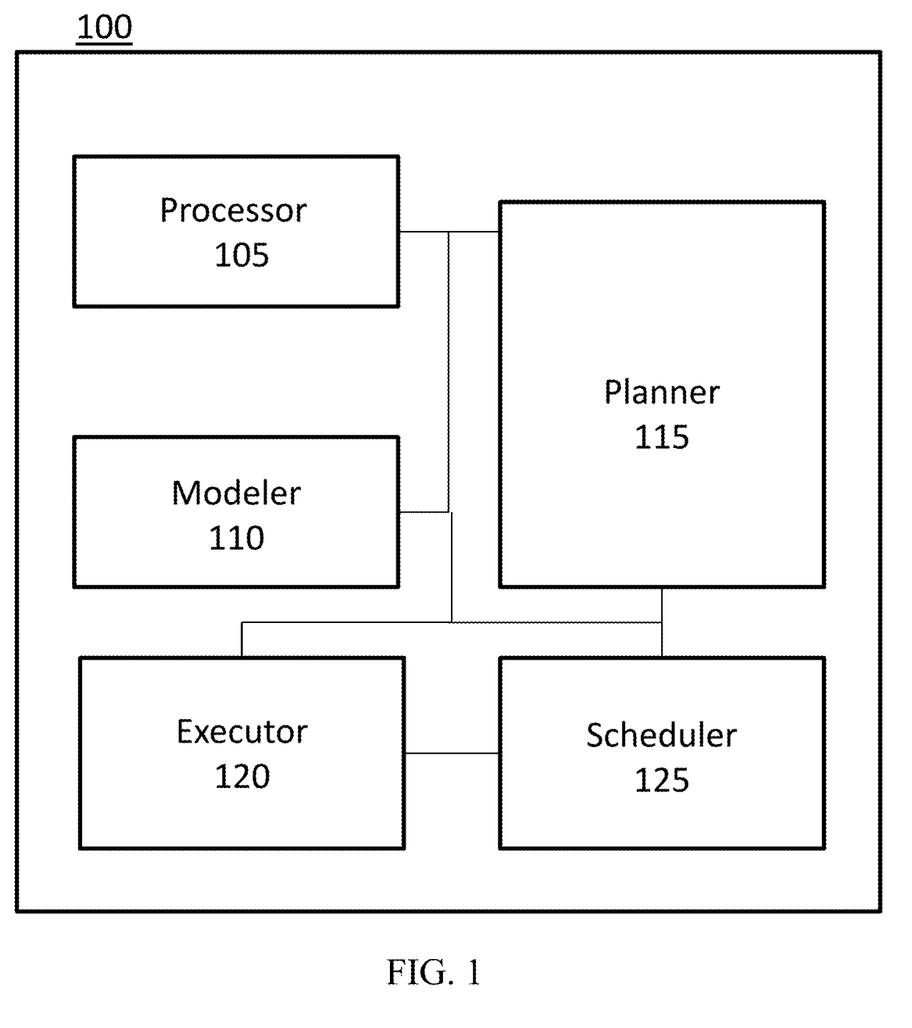
FIG. 1 is a schematic representation of a system for fulfilling services in accordance with one or more example embodiments.

Turning to FIG. 1, a schematic representation of a system for fulfilling services according to one or more embodiments is shown. In such a system 100, a processor 105 is connected to a modeler 110 and a planner 115. In certain systems 100, more than one processor 105 may be connected to modeler 110 and/or planner 115. The processor 105 may include a virtual device or a physical device such as electronic circuitry that includes an integrated circuit, programmable circuit, application integrated circuit, controller, processor, semiconductor, processing resource, chipset, or other types of component capable of managing system 100.

The modeler 110 builds a model (not shown) that represents a set of services and relationships between such services. The model may be used as an input to planner 115, which may apply dependency rules to define the different types of relationships between the services. Examples of relationships may include two or more services being related as siblings, whereby the services may operate concurrently, and not rely on each other. Other types of relationships may include parent-child relationships, whereby the child service may rely on the parent service. In such a parent-child relationship, the child service may not be executed until the parent service is completed. The application of dependency rules thereby creates inter-step dependencies between certain steps within a set of services. Creating inter-step dependencies allows planner 115 to develop an orchestration plan that includes a step graph that defines an order of execution for particular steps.

As will be discussed in detail below, the step graph may allow for the execution of nondependent steps concurrently. Modeler 110 may be a physical device such as electronic circuitry that includes an integrated circuit, programmable circuit, application integrated circuit, controller, processor, semiconductor, processing resource, chipset, or other types of components capable of managing system 100. Alternatively, modeler 110 may include instructions, e.g., stored on a machine-readable medium, that when executed by processor 105 builds the model. Implementations of the model may include state models, a multi-technology operations system interface model ("MTOSI"), conception models, mathematical models, computer models, or other types of models that illustrate the inter-connectedness of the set of services to each other by the differing types of relationships.

The planner 115 may use the model as provided by modeler 110 to apply dependency rules to create inter-step dependencies between the various services. Based on the creation of the inter-step dependencies, planner 115 may proceed to develop an orchestration plan. In certain implementations, planner 115 may develop a step graph, as will be illustrated in detail below, prior to development of the orchestration plan. Planner 115 may use the model to determine whether specific steps are dependent or nondependent. Nondependent steps may then be identified and scheduled to execute concurrently. Nondependent steps may include any steps that do not depend on other steps within the plan and will be discussed in detail below.

Planner 115 may be a physical device such as electronic circuitry that includes an integrated circuit, programmable circuit, application integrated circuit, controller, processor, semiconductor, processing resource, chipset, or other types of components capable of managing system 100. Alternatively, planner 115 may include instructions, e.g., stored on a machine-readable medium, that when executed by processor 105 develop the orchestration plan.

Dependency rules may be used to define the different types of relationships between services created in the model. For example, a set of dependency rules may apply to parent types of relationships. Another set of dependency rules may apply to child relationships, sibling relationships, or other relationships defined therein. Examples of relationships may include two or more services being related as siblings, whereby the services may operate concurrently and not rely on each other. Other types of relationships may include parent-child relationships, whereby the child service may rely on the parent service. In such a parent-child relationship, the child service may not be executed until the parent service is completed. The application of dependency rules by planner 115 results in inter-step dependencies between different steps representing state transitions in a set of services. To, produce the inter-step dependencies for the state transitions, dependency rules may include a set of principles that define the state transitions for the different types of relationships within system 100.

An orchestration plan is produced by planner 115 upon creation of the inter-step dependencies. The orchestration plan defines an order for which steps will be executed. Because of the creation of the inter-step dependencies, the orchestration plan allows nondependent steps to be identified so that the execution of certain steps may proceed in parallel, thereby allowing certain nondependent steps to be executed concurrently.

System 100 may further include an executor 120, that executes the devised orchestration plan. The executor 120 may receive revised orchestration plans from planner 115 as the plans are revised based on automatically generated modifications or user input. Executor 120 may be a physical device such as electronic circuitry that includes an integrated circuit, programmable circuit, application integrated circuit, controller, processor, semiconductor, processing resource, chipset, or other types of components capable of managing system 100. Alternatively, executor 120 may include instructions, e.g., stored on a machine-readable medium, that when executed by processor 105 executes the orchestration plan.

System 100 may also include a scheduler 125. The scheduler 125 may track progress of the orchestration plan based on the start of execution of a step and the completion of the step. The scheduler may then indicate which steps do not have dependencies preventing them from executing, at which point the executor 120 may start all nondependent steps. To track nondependent steps, the scheduler may assign each step a dependency count. If a step depends on one other step, it may have a count of one. If it depends on two other steps it may have a count of two, and so one. When a step has a dependency count of zero, there are no steps preventing execution of the step. Accordingly, the executor 120 may provide instructions to begin the step. As a service completes, all dependent steps have their respective dependency counts reduced by one. As such, the scheduler 125 substantially continuously updates the plan, thereby allowing all nondependent steps to execute when the services no longer have any dependencies. Other methods of tracking step dependency may also be employed. For example, a dependency count that counts using increasing values, decreasing values, or reaching a specific value may be used.

Certain parameters may be added to the orchestration plan and/or scheduler 125 in order to prevent steps from executing. For example, a max load parameter may be established, whereby a user or other system defines the maximum number of steps that may run at the same time. For example, a user may indicate that up to two hundred and fifty (250) steps may execute simultaneously. This parameter may be added in order to prevent too many steps from running simultaneously, which could decrease system 100 performance. The max load parameter may be specified to a configured default, a per-request maximum, and/or a dynamic per service maximum as defined in the modeling language. If a step is conditional upon the maximum to be less than the current number of concurrently executing steps at the time of the request, the system 100 will wait for the correct number of steps to complete before executing the subsequent step. The max load parameter may vary based on software and hardware limitations of a particular system 100, as well as desired performance speeds.

The scheduler 125 may also provide system 100 information with respect to failed steps. If a step fails, scheduler 125 may indicate that the step did not complete, thereby allowing for modifications to the plan in order to take into account the failed step. In certain implementations, dependencies for all steps that depend on the failed step may be adjusted. For example, the dependent steps may be told to begin execution, cancel the step, or otherwise adjust such dependent steps.

Similarly, the system 100 may stop submitting steps that depend on another step that, depends upon revision to the orchestration plan. The orchestration plan may subsequently be recomputed when there are no further steps to execute. As such, system 100 may continue to operate without necessitating a revised orchestration plan based on a dependent step.

Figure 2:
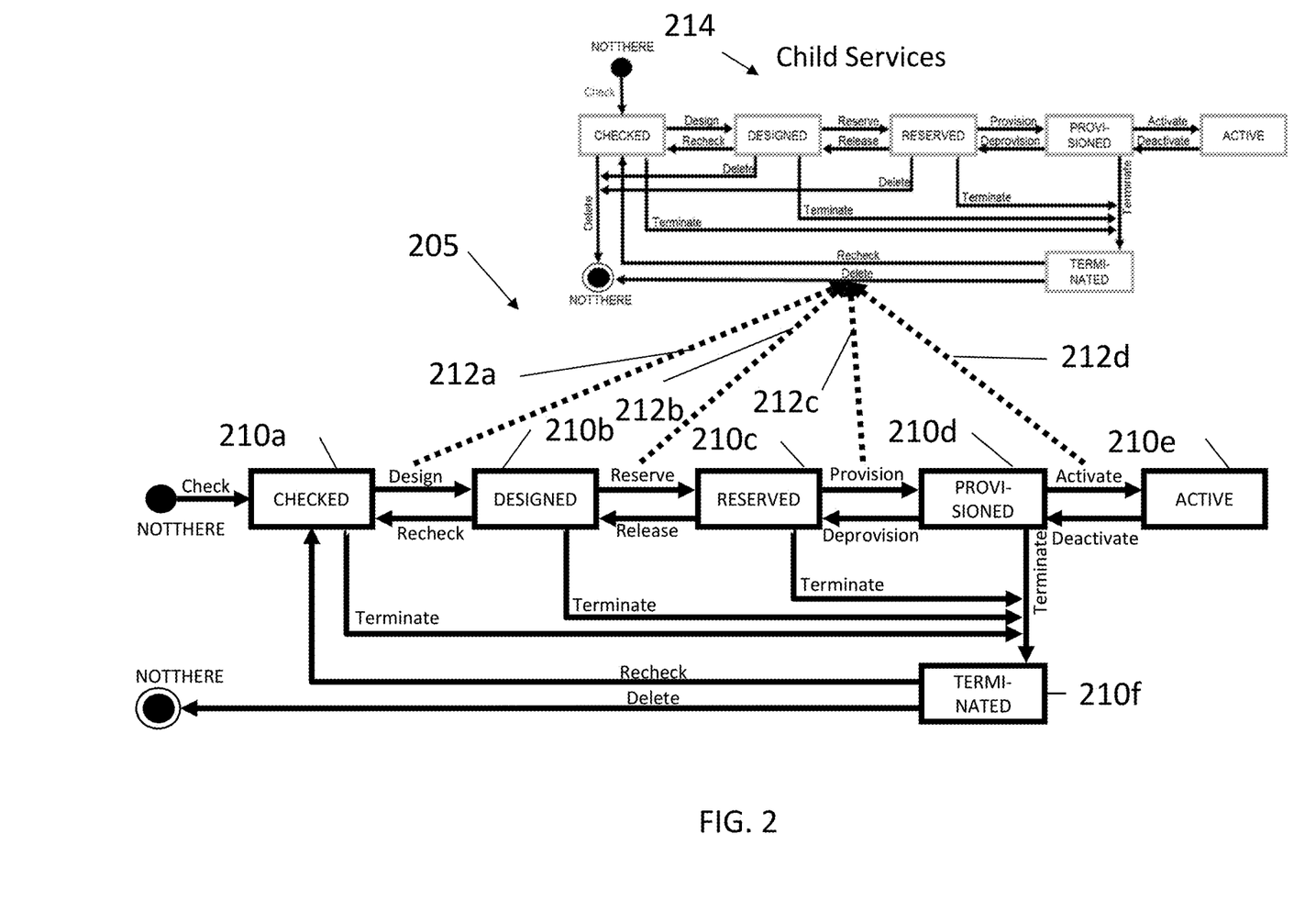
FIG. 2 is a state model in accordance with one or more example embodiments.

Turning to FIG. 2, a state model according to one or more, embodiments is shown. State model 205 illustrates potential state transitions 210a-210e for a given service. State model 205 is represented as a MTOSI that includes initial state transition 210a and potential state transitions 210b-210f. This model may be used by service providers as a mechanism to manage complex networks and corresponding services, such as service 200 of FIG. 3. In other implementations, state model 205 may include conceptual models or other visual depictions representing various states of a given service. State model 205 may further provide a visual depiction of the inter-relatedness of the set of services by rendering possible state transitions 210a-210f.

In this implementation, the application of the dependency rules creates inter-service dependencies 212a-212d. Inter-service dependencies 212a-212d are dependencies that exist between state transitions between the services, which in this example are the given service (represented by state model 205) and related child services 214. In this example, the given service transition from state "checked" 210a to "designed" 210b creates inter-service dependency 212a that depends on a state transition (not illustrated) in child services 214. In another example, the given state transition from "designed" 210b into "reserved" 210 has dependence 212b to another state transition (not illustrated) in child services 214. In yet another example, the state transition from "reserved" 210c into "provisioned" 210d has inter-service dependency 212c to another state transition corresponding to child services 214. In one more example, the state transition for the given service from "provisioned" 210d into "active" 210e has inter-service dependency 212d to another state transition corresponding to child services 214. Accordingly, application of the dependency rules creates the inter-service dependencies 212a-212d between multiple services that are related. While parent-child dependencies are discussed herein, inter-service dependencies 212a-212d may be created for all services in a system. Such state models 205 may thus be created for each dependency relationship within a system. Specific examples of the types of dependency rules that may be applied are explained in detail below.

Figure 3:
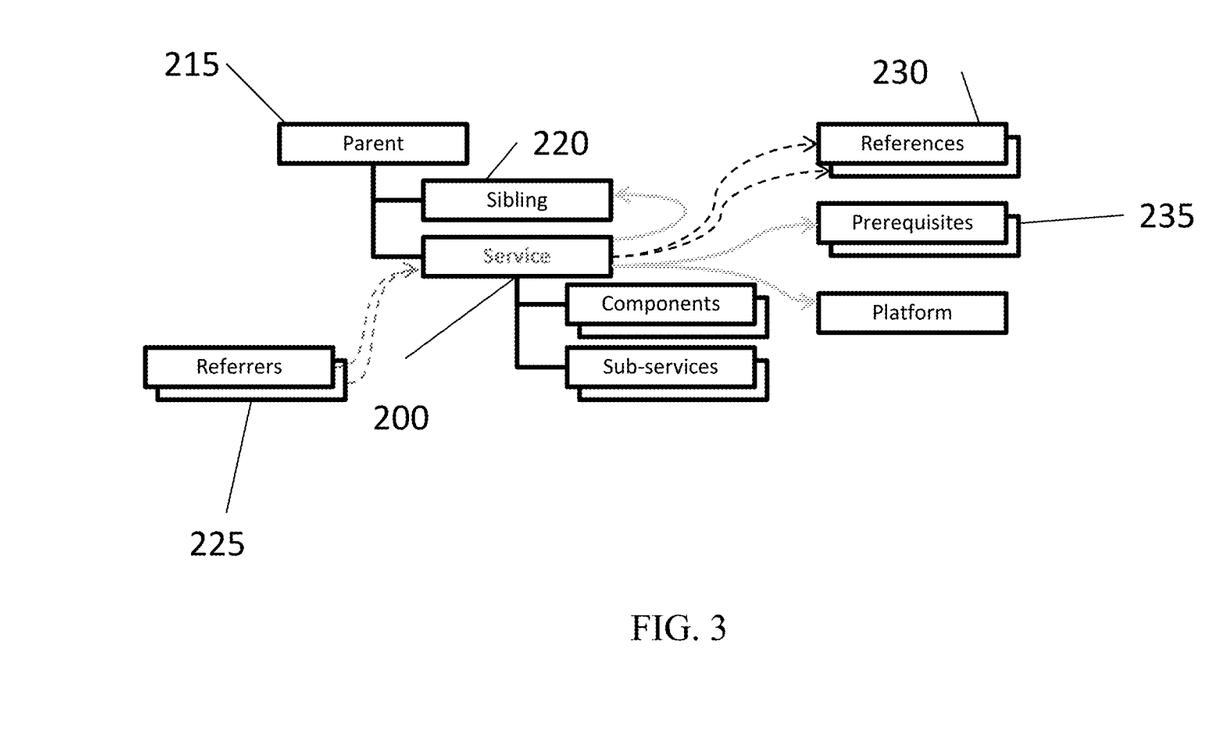
FIG. 3 is a representation of service relationships in accordance with one or more example embodiments.

Turning to FIG. 3, a representation of service relationships according to one or, more embodiments is shown. The different types of relationships, between services 200 may include, for example, parent, sibling, referrers, references, prerequisites, and the like. The arrows represent the relationship of a given service 200 to other services. For example, there is a parent service 215 to given service 200. There is also a sibling service 220 to service 200, wherein sibling service 210 also has a relationship as a child to parent service 215. Defining the relationships between the services allows the order in which particular services may be completed to be graphically represented. In this example, service 200 may have to wait for parent service 215 to complete before it may begin. Sibling service 220 may also have to wait for parent service 215 to complete before it begins, however, sibling service 220 may execute at the same time as service 200. Additional services may include referrers 225 to given service 200, as well as reference service 230 and any number of prerequisite services 235 to given service 200. The state model developed in FIG. 2 may also include different types of relationships between given service 200 and other services. Depending on the type of relationship, a set of dependency rules may be applied to the different types of relationships to create inter-service dependencies illustrated in FIG. 4.

Figure 4:
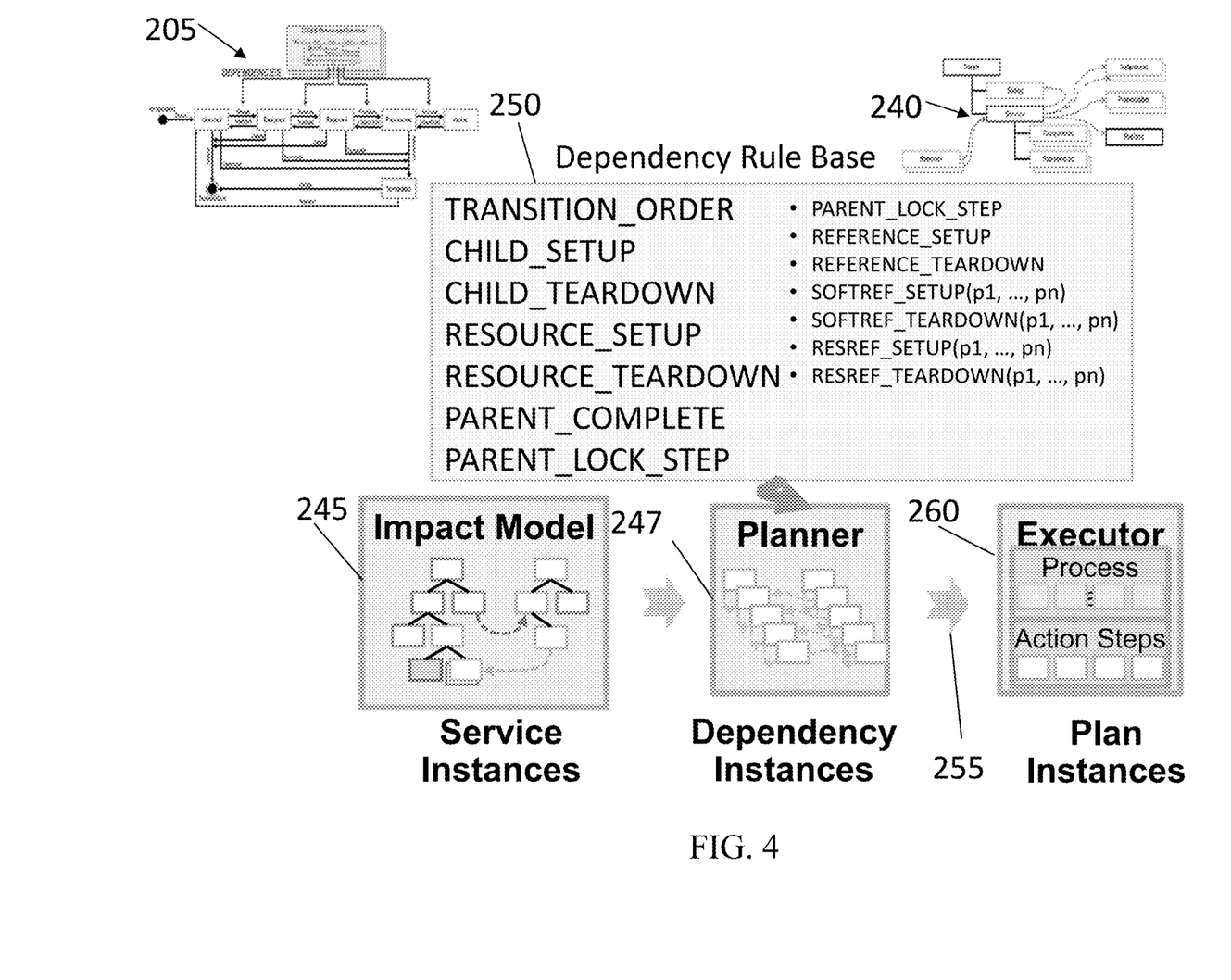
FIG. 4 is a representation of a system architecture to develop an orchestration execution plan in accordance with one or more example embodiments.

Turning to FIG. 4, a representation of a system architecture to develop an orchestration plan according to one or more embodiments is shown. FIG. 4 shows how a service 205 relates to other services via different types of relationships (e.g., parent, sibling, child, referrer, pre-requisite, references, etc.). Impact model 245 may develop a model that is used by the planner 247. Planner 247 applies dependency rules 250 which are specific to the different types of relationships. By applying dependency rules 250, the planner 247 creates inter-step dependencies between the given service 205 and other services as represented by 240.

Creating, the inter-step dependencies, the planner 247 creates a step graph (not illustrated). Examples of step graphs are discussed in later figures. Using the step graph, the planner may apply a topological sorting algorithm 255 to obtain a list of state transitions for execution by the executor 260. The list of state transitions is developed by an orchestration plan (not, illustrated). In an example implementation, the orchestration, plan includes the sequenced order of state transitions for execution. Implementations of components impact model 245, planner 247, and executor 260 may include electronic circuitry (i.e., hardware) such as an integrated circuit, programmable circuit, application integrated circuit (ASIC), controller, processor, semiconductor, processing resource, chipset, or other types of hardware components capable of building model 240 and developing the list of state transitions in which to execute. Alternatively, impact model 245, planner 247, and executor 260 may include instructions (e.g., stored on a machine-readable medium) that, when executed by a hardware component (e.g., controller and/or processor) builds a model and develops the sequenced order of state transitions, accordingly.

Figure 5:
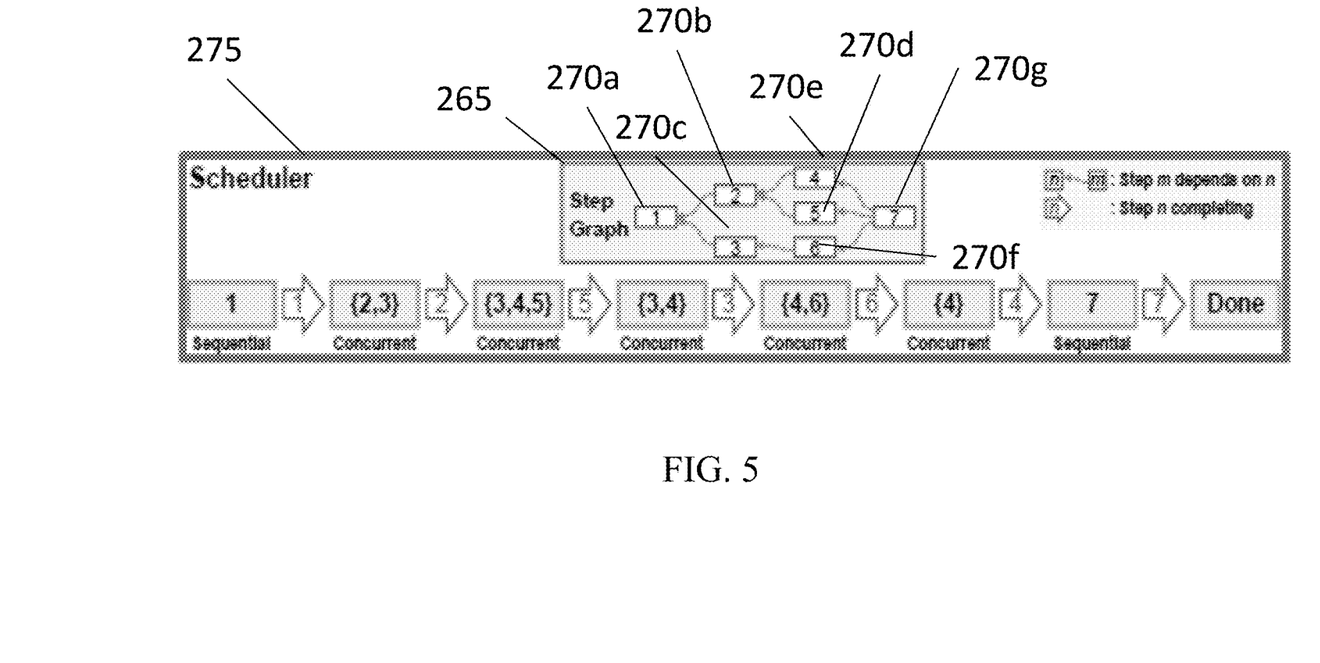
FIG. 5 is a step graph and scheduler in accordance with one or more example embodiments.

Referring to FIG. 5, a step graph and scheduler according to one or more embodiments is shown. The step graph 265 includes a number of individual steps 270, that have one or more dependencies relative to their respective positions. In this example, step 1 (270a) has two dependencies, illustrated as steps 2 (270b) and 3 (270c). Step 2 (270b) has two dependencies, illustrated as steps 4 (270d) and 5 (270e). Step 3 has one dependency, step 6 (270f) and similarly, step 6 (270d) has one dependency, step 7 (270g). Steps 4 (270d) and 5 (270e) have one dependency, step 7 (270g). Step 7 (270g) depends on step 4 (270d), step 5, (270e), and step 6 (2700.

During operation, a scheduler 275 tracks a dependency count for each step. When the dependency count for a particular step reaches 0, the step may proceed. In this example, step 1 (270a) has a dependency count of 0 because it does not depend on any other steps. Steps 2-6 (270b-2701) have a dependency count of 1 because each step only depends on one step 270 before. Step 7 (270g) has a dependency count of 3 because it depends on three prior steps 270d-270f. After step 1 (270a) completes, the schedule decreases the dependency count for all directly depending steps 270 by a value of 1. Thus, after step 1 (270a) completes, the dependency count of steps 2 (270b) and 3 (270c) have a new dependency count of 0. Because the dependency count of steps 2 (270b) and 3 (270c) is now 0, the steps may be executed concurrently. However, steps 4-7 (270d-270g) do not have their dependency count reduced because the steps before them have not completed.

After the completion of step 2 (270b), step 3 (270c) may still be processing. In prior solutions, all steps that depend from step 2 (270b) would have to wait for the completion of step 3 (270c) before executing. However, as step 2 (270b) is completed, the scheduler decreases the dependency count of step 4 (270d) and step 5 (270e) by 1, which brings their dependency count to 0, thereby allowing them to concurrently execute along with step 3 (270c). Upon completion of step 3 (270c), step 6 (270f) may begin. As step 4 (270d), step 5 (270e), and step 6 (270f) complete, the scheduler 275 will track their completion. Step 7 (270g) cannot begin execution until all of steps 4-5 (270d-270f) are complete. For example, step 4 (270d) may complete first, at which time the scheduler 275 will reduce the dependency count of step 7 (270g) by 1, bringing its dependency count to 2. When the dependency count of step 7 (270g) reaches 0, step 7 (270g) may begin execution. Upon completion of step 7 (270g), the scheduler may start the process over or otherwise follow additional instructions provided in the orchestration plan.

Prior to finalization of the orchestration plan, the step graph 265 may be topologically sorted to determine whether there are any circularities that may cause the steps 270 to enter an infinite loop. For example, if step 1 (270a) was dependent on step 3 (270c) and step 3 (270c) was dependent on step 1 (270a) an infinite loop would be created, thereby preventing the operation from proceeding. The step graph 265 may be sorted by the planner using a linear-time algorithm. In one implementation, the linear-time algorithm executable by the planner may include Tarjan's Algorithm.

The methods of tracking the dependency between specific steps 270 discussed above represents one method for tracking step 270 dependency. In other implementations, tracking dependency may include increasing dependency count, increasing dependency count, or executing a step 270 when a particular assigned or derived value is reached. Accordingly, tracking step 270 dependency refers to the ability to determine whether a particular step 270 depends on another particular step 270 that would prevent execution of the subject step 270.

Figure 6:
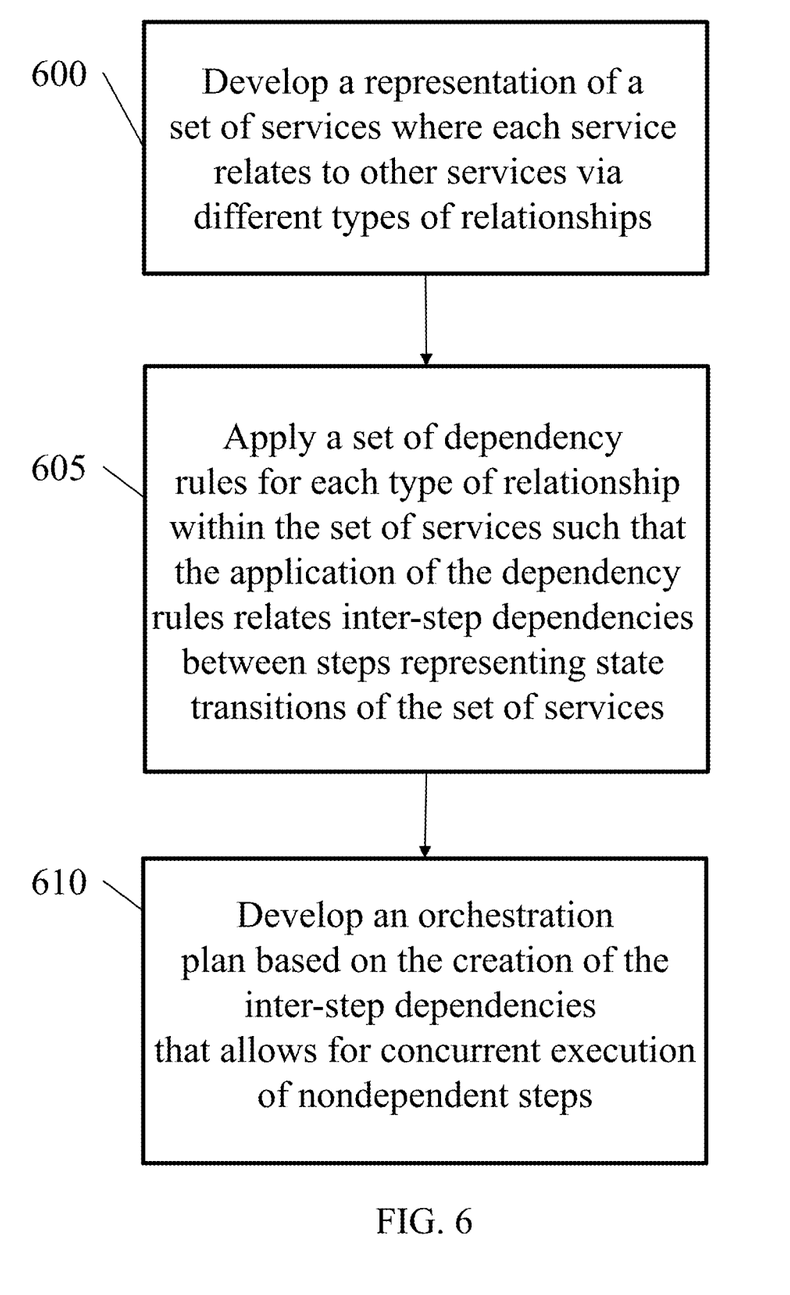
FIG. 6 is a flow diagram of a method of executing services concurrently in accordance with one or more example embodiments.

Turning specifically to FIG. 6, a flow diagram of a method of executing steps concurrently according to one or more embodiments is shown. In this example, a representation is developed (600) of a set of services where each service relates to other services via different types of relationships. The specific relationships, such as those discussed above, may include parent, child, relationship, referral, prerequisite, and the like. Depending on the type of services, the graphs of the relationships may include directed acyclic graphs ("DAGs") containing nodes and arches, as well as directed DAGs that include forests of spanning trees, with cross-references therebetween. In other implementations, the graphs may be cyclic directed graphs, that contain nodes and arcs with one or more connections, as well as cyclic directed graphs that include forests of spanning trees that contain cross-references between the nodes. Various types of directed graphs may be used according to the implementations discussed herein.

During the development (600) of a representation, each service is modeled as related to other services by different types of relationships. In one implementation, the computing device may build a MTOSI model as input. By building a model, the computing device represents the type of relationships that exist between each service.

The method further includes applying (605) a set of dependency rules for each type of relationship within the set of services such that the application of the dependency rules creates inter-step dependencies between steps representing state transitions of the set of services. As explained above, each service may be defined as including specific inter-step dependencies, thereby preventing the execution of a specific step until completion of one or more other steps. The dependency rules may allow for the automatic generation and modification of subsequently discussed graphs.

The set of dependency rules may depend on the type of relationship between a given service and other services. Examples of the set of dependency rules may be possible to view state transitions that should be executed before and after a given dependency rule. This provides an indication of the set of dependency rules that may have caused the dependency between steps representing state transitions of the services. An example of the dependency rules is listed below, however, other dependency rules may be implemented. Accordingly, there may be additional dependency rules or fewer dependency rules than those listed below. For example, the set of dependency rules as grouped according to the type of relationship. For a child type of relationship, the dependency rules may include the following:

CHILD_SETUP—A child service/component waits for its parent to reach a given MTOSI state before the child is set-up to the same MTOSI state.

CHILD_TEARDOWN—Parent services wait to be torn down to any given MTOSI state until their child components/services are at most at that state first.

RESOURCE_TEARDOWN—The resource child waits for the parent to be TERMINATED before being torn down.

In another example, for the parent relationship, the dependency rules may include the following:

PARENT_COMPLETE—The parent waits for its children to be complete, before the parent itself is marked as complete. Note that the meaning of "complete" depends on the desired state of the service.

PARENT_LOCK_STEP—If the lockstep: true option is defined in the descriptor, then the parent setup progression is waiting for the child state to be progressed lockstep according to the MTOSI state model, so that the parent state is not more than one state ahead of the child state.

PARENT_LOCK_STEP_TEARDOWN—If the lockstep: true option is defined in the descriptor, then the parent teardown progression is waiting for the child state to be progressed lockstep according to the MTOSI state model, so that the parent, state is not more than one state higher than the child state.

RESOURCE_SETUP—A parent service waits for resources to be ACTIVE, before the parent becomes DESIGNED In yet another example, for the reference relationship the dependency rules may include the following:

REFERENCE_SETUP—The service should wait for its reference to reach its desired state (typically ACTIVE) before progressing to RESERVED state.

REFERENCE_TEARDOWN—The referenced service is not automatically torn down until its last referrers have been torn down. Also, if the last referrer changes its reference parameter to a different service, there may be a shadow version still holding on to the old reference. So the teardown of the referenced service waits until the shadow version is removed.

SOFTREF_SETUP(p1, p2, . . . , pn)—When a prerequisite parameter (other than reference and auxreference) references a service, then the state of the referrer stays behind the state of the referenced service during setup. Note that this is different from REFERENCE_SETUP because the referenced service is not forced to become ACTIVE before the referrer; rather the referrer may be in, a lower MTOSI state. The dependency lists the names of the parameter(s) that created the dependency—so these parameters are likely candidates for a prerequisite: false annotation.

SOFTREF_TEARDOWN(p1, p2, . . . , pn)—Same as SOFTREF_SETUP, but for preventing teardown of the referenced service.

REFERENCE_LOCKSTEP—Like SOFTREF_SETUP but holding back the state of the referenced service to stay at most one MTOSI state ahead of the referrer service. Similar to REFERENCE_TEARDOWN, but holding back the state of the referenced service to stay at most one MTOSI state larger than the state of the referrer service.

RESREF_SETUP(p1, p2, . . . , pn)—This works like softreferences, but this rule is generated instead of SOFTREF_SETUP when a parameter is specified with prerequisite: resource. With this rule, the services referenced by the listed parameters are taken to their desired state even before the current service becomes DESIGNED. So it is like REFERENCE_SETUP, but it works for any parameter and is even more restrictive. In release 2.2.1 the prerequisite: resource annotation does not, work for parameters reference and auxreference.

RESREF_TEARDOWN(p1, p2, . . . , pn)—Same as RESREF_SETUP but for preventing early teardown of the referenced service.

TRANSITION_ORDER—The sequence of state-transitions defined by the MTOSI state model.

The method also includes developing (610) an orchestration plan based on the creation of the inter-step dependencies that allows for concurrent execution of nondependent steps. As explained with respect to FIG. 5, the orchestration plan may be based on a step graph that is generated, which includes a plurality of steps. Each step on the step graph may represent a process and may be represented as or be based on one or more of the types of directed graphs discussed above. During operation, a scheduler may track a dependency between specific steps on the step graph. In certain implementations, the scheduler may track dependency using a dependency count. The scheduler may subsequently decrease the dependency count of a step when all steps it depends from are complete. Thus, in certain implementations, a step may depend from more than one prior step. The step may wait for every step from which it depends to execute. By creating and graphing the relationship between the individual steps, steps that do not depend on one another may execute concurrently. Accordingly, the method further includes executing at least two nondependent steps concurrently. The nondependent steps may execute when the specific step has a dependency count of zero. As such, a plurality of steps may run simultaneously, contingent on the specific steps having a dependency count of zero. Other methods of counting steps, such as those discussed above, may also be used to determine which steps may execute concurrently.

While discussion is included herein about a process with seven (7) steps, with respect to FIG. 5, in operation there may be hundreds or even thousands of steps in a process.

Similarly, while one to three dependencies are expressly disclosed herein, in practice, each step may depend on a plurality of steps exceeding three.

The method may further include various other implementations to further enhance execution speeds. For example, in one implementation a step graph may be rejected if the step graph contains a circularity that would cause an infinite loop. For example, if two steps were dependent on each other, the process would not advance because there would never be completion, thereby resulting in an infinite loop. To prevent such a loop, in developing the orchestration plan, the planner may provide a sort function, that sorts the topology of the step graph. In certain implementations, the topological sorting may be performed using Tarjan's Algorithm.

Figure 7:
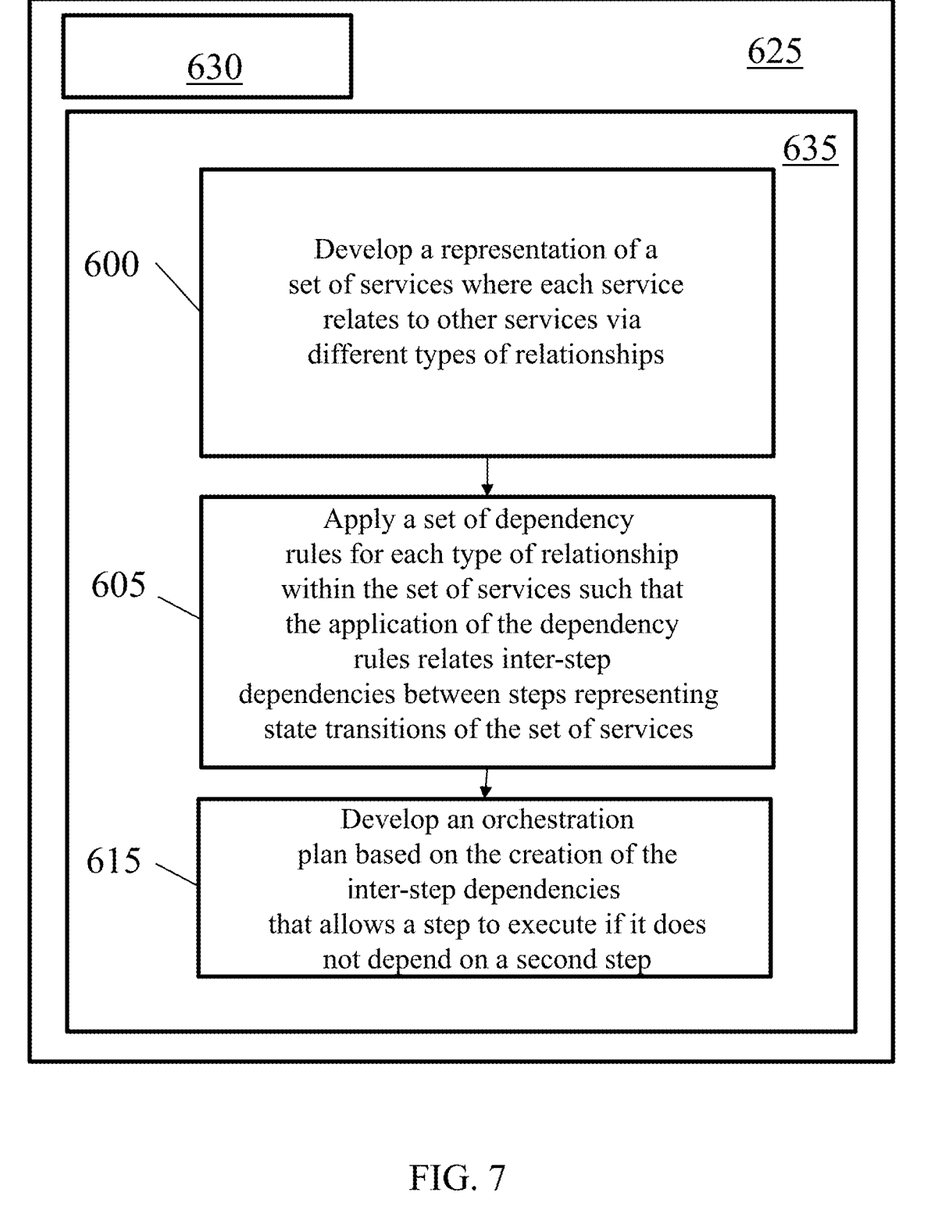
FIG. 7 is an example computing device with a hardware processor and accessible machine-readable instructions in accordance with one or more example embodiments.

Turning to FIG. 7, an example computing device with a hardware processor and accessible machine-readable instructions is shown in accordance with one or more example embodiments. FIG. 7 provides an example computing device 625, with a hardware processor 630, and accessible machine-readable instructions stored on a machine-readable medium 635 for performing the execution of an orchestration plan having a plurality of nondependent steps discussed above with respect to one or more disclosed example implementations. FIG. 7 illustrates computing device 625 configured, to perform the flow described in blocks 600, 605 and 615, as well as the flow described in blocks 600, 605, and 610, discussed in detail with respect to FIG. 6. However, computing device 625 may also be configured to perform the flow of other methods, techniques, functions, or processes described in this disclosure.

In this implementation the development of the orchestration plan based on the creation of inter-step dependencies includes allowing a first step to execute if it does not depend on a second step. For example, if the second step depends on the first step, the second step has an inter-step dependency that prevents its execution until the first step is complete. An example inter-step dependency may include a parent child relationship. In another example, the second step may depend on a step between the first step and second step. In such an example, the second step may have a parent grandchild relationship and the child step may create a dependency in addition to the parent step. In certain implementations, the first step and the second step may execute concurrently, providing neither step depends on one another and neither step depends on a third step that is related to either the first step or the second step.

A machine-readable storage medium, such as 635 of FIG. 7, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 8:
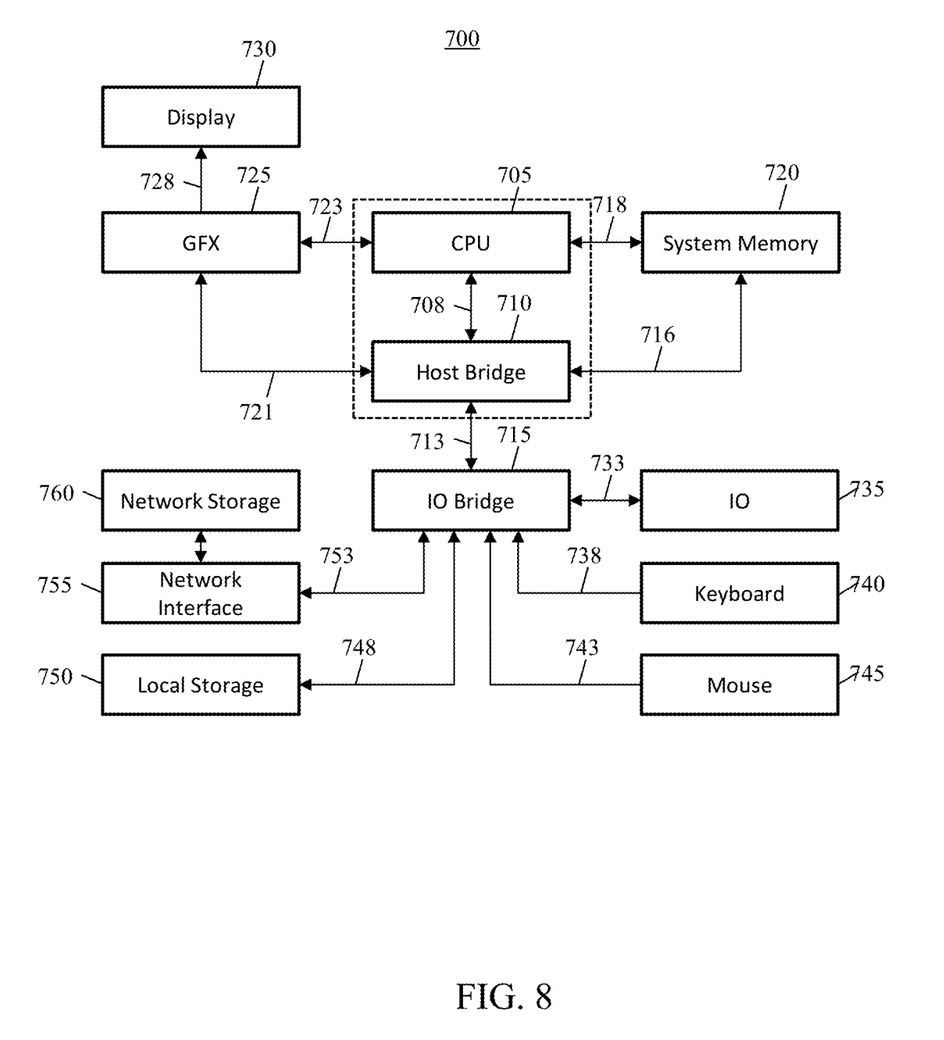
FIG. 8 is a schematic representation of a computer processing device that may be used to implement functions and processes in accordance with one or more example embodiments.

Turning to FIG. 8, a schematic representation of a computer processing device 800 that may be used to implement functions and processes in accordance with one or more example embodiments is shown. FIG. 8 illustrates a computer processing device 700 that may be used to implement the systems, methods, and processes of this disclosure. For example, computing device 700 illustrated in FIG. 8 could represent a client device or a physical server device and include either hardware or virtual processor(s) depending on the level of abstraction of the computing device. In some instances (without abstraction), computing device 7 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware. In one implementation, computing device 700 may allow a subscriber to remotely access one or more data centers. Similarly, the management tool used by the subscriber may include a software solution that runs on such a computing device 700.

FIG. 7 shows a computing system 700 in accordance with one or more example embodiments. Computing system 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same, physical die (not shown) or a plurality of processor cores (not shown) disposed on multiple die (not shown) that are collectively disposed within the same mechanical package (not shown). Computing system 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain embodiments, CPU 705 may integrate the functionality of GFX 725 and interface directly (not shown) with display 730. Host bridge 710 may include an interface 708 to CPU 705, an interface 713 to IO bridge 715, for embodiments where CPU 705 does not include interface 718 to system memory 720, an interface 716 to system memory 720, and for embodiments where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi, Bluetooth, or any other network protocol suitable to facilitate networked communications. Computing system 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing system 00 and may be accessible to computing system 700 via one or more network interfaces provided by one or more network interface devices 755.

One of ordinary skill in the art will recognize that computing system 700 may include one or more application specific integrated circuits ("ASICs") that are configured to perform a certain function, such as, for example, hashing (not shown), in a more efficient manner. The one or more ASICs may interface directly with an interface of CPU 705, host bridge 760, system memory 720, or IO bridge 715. Alternatively, an application-specific computing system (not shown), sometimes referred to as mining systems, may be reduced to the components that perform the desired function, such as hashing via one or more hashing ASICs, to reduce chip count, motherboard footprint, thermal design power, and power consumption. As such, one of ordinary skill in the art will recognize that the one or more CPUs 705, host bridge 710, IO bridge 715, or ASICs or various subsets, super-sets, or combinations of functions or features thereof, may be integrated, in whole or in part, or distributed among various devices in a way that may vary based on an application, design, or form factor in accordance with one or more example embodiments. As such, the description of computing system 700 is merely exemplary and not intended to limit the type, kind, or configuration of components that constitute a computing system suitable for performing computing operations, including, but not limited to, hashing functions. Additionally, one of ordinary skill in the art will recognize that computing system 600, an application specific computing system (not shown), or combination thereof, may be disposed in a standalone, desktop, server, or rack mountable form factor.

One of ordinary skill in the art will recognize that computing system 700 may be a cloud-based server, a server, a workstation, a desktop, a laptop, a netbook, a tablet, a smartphone, a mobile device, and/or any other type of computing system in accordance with one or more example embodiments.

It should be appreciated that all combinations of the foregoing concepts (provided such concepts are not mutually inconsistent) are contemplated as being part of the inventive subject, matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied, as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, systems and methods disclosed herein may be used to increase processing speed executing nondependent steps in a service set.

In one or more examples, systems and methods disclosed herein may be used to decrease the time for executing a plan.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope of claims below as, illustrated by the example embodiments disclosed herein.

What is claimed is:

1. A method to execute an orchestration plan of computing services concurrently, the method comprising:
    developing a representation of a set of services where each service relates to other services via different types of relationships;
    applying a set of dependency rules for each of the different types of relationships within the set of services such that the application of the set of dependency rules creates inter-step dependencies between steps representing state transitions of the set of services;
    determining that a circularity causes the steps representing state transitions of the set of services to enter an infinite loop of operational steps absent completion;
    implementing a sort function to prevent the circularity from proceeding in the orchestration plan;
    finalizing the orchestration plan based on the inter-step dependencies; and
    executing the orchestration plan that allows for concurrent execution of nondependent steps and absent the circularity.

2. The method of claim 1, wherein the set of services includes at least two nondependent services and the method further comprises executing at least two nondependent steps concurrently.

3. The method of claim 1, wherein the developing the orchestration plan comprises creating a step graph of the services having a plurality of steps.

4. The method of claim 3, further comprising rejecting the step graph based on the circularity that would cause the infinite loop.

5. The method of claim 3, further comprising tracking a dependency between the plurality of steps.

6. The method of claim 5, further comprising identifying the steps that have no dependencies and executing the steps that have no dependencies.

7. The method of claim 1, wherein the sort function comprises sorting topologically a step graph using Tarjan's Algorithm.

8. The method of claim 1, wherein the applying the set of dependency rules for each of the different types of relationships comprises creating steps having a parent-child relationship.

9. The method of claim 1, wherein the applying the set of dependency rules for each of the different types of relationships comprises creating steps having a sibling relationship.

10. A non-transitory computer readable medium comprising computer executable instructions stored thereon that when executed by one or more processing units perform a method to execute an orchestration plan of services concurrently, the instructions to:

develop a representation of a set of services where each service relates to other services via different types of relationships;

apply a set of dependency rules for each of the different types of relationships within the set of services such that the application of the set of dependency rules creates inter-step dependencies between steps representing state transitions of the set of services;

determine that a circularity causes the steps representing state transitions of the set of services to enter an infinite loop of operational steps absent completion;

implement a sort function to prevent the circularity from proceeding in the orchestration plan;

finalize the orchestration plan based on the creation of the inter-step dependencies; and execute the orchestration plan that allows a step to execute if it does not depend on a second step and absent the circularity.

11. The computer readable medium of claim 10, further comprising instructions to execute at least two steps that do not depend on each other concurrently.

12. The computer readable medium of claim 10, wherein developing the orchestration plan comprises generating a step graph having a plurality of steps.

13. The computer readable medium of claim 12, further comprising instructions to reject the step graph based on the circularity that would cause the infinite loop.

14. The computer readable medium of claim 12, further comprising instructions to track a dependency between the plurality of steps.

15. The computer readable medium of claim 14, further comprising instructions to identify the steps that have no dependencies and execute the steps that have no dependencies.

16. A system to develop an orchestration plan comprising:
a modeler that develops a representation of each service as related to other services via different types of relationships; and a planner connected to the modeler and a processor that:
applies a set of dependency rules for each of the different types of relationships between each service and other services and based on the application of the set of dependency rules, creates inter-step dependencies between steps representing a state transition of each service, determines that a circularity causes the steps representing state transitions of the set of services to enter an infinite loop of operational steps absent completion, implements a sort function to prevent the circularity from proceeding in the orchestration plans, based on the inter-step dependencies, finalizes the orchestration plan, and executes the orchestration plan that allows for concurrent execution of nondependent steps and absent the circularity.

17. The system of claim 16, further comprising an executor connected to the planner that executes nondependent steps concurrently.

18. The system of claim 16, wherein the planer obtains a step graph wherein each node within the step graph represents the step representing the state transition for a different service and uses the step graph to develop the orchestration plan.

19. The system of claim 18, wherein the planner provides the sort function of the step graph to prevent the circularity from causing the infinite loop.

20. The system of claim 18, further comprising a scheduler that tracks a dependency between a plurality of steps.

* * * * *